W. E. & H. L. BOCK.
MOTOR VEHICLE.
APPLICATION FILED JULY 11, 1913.

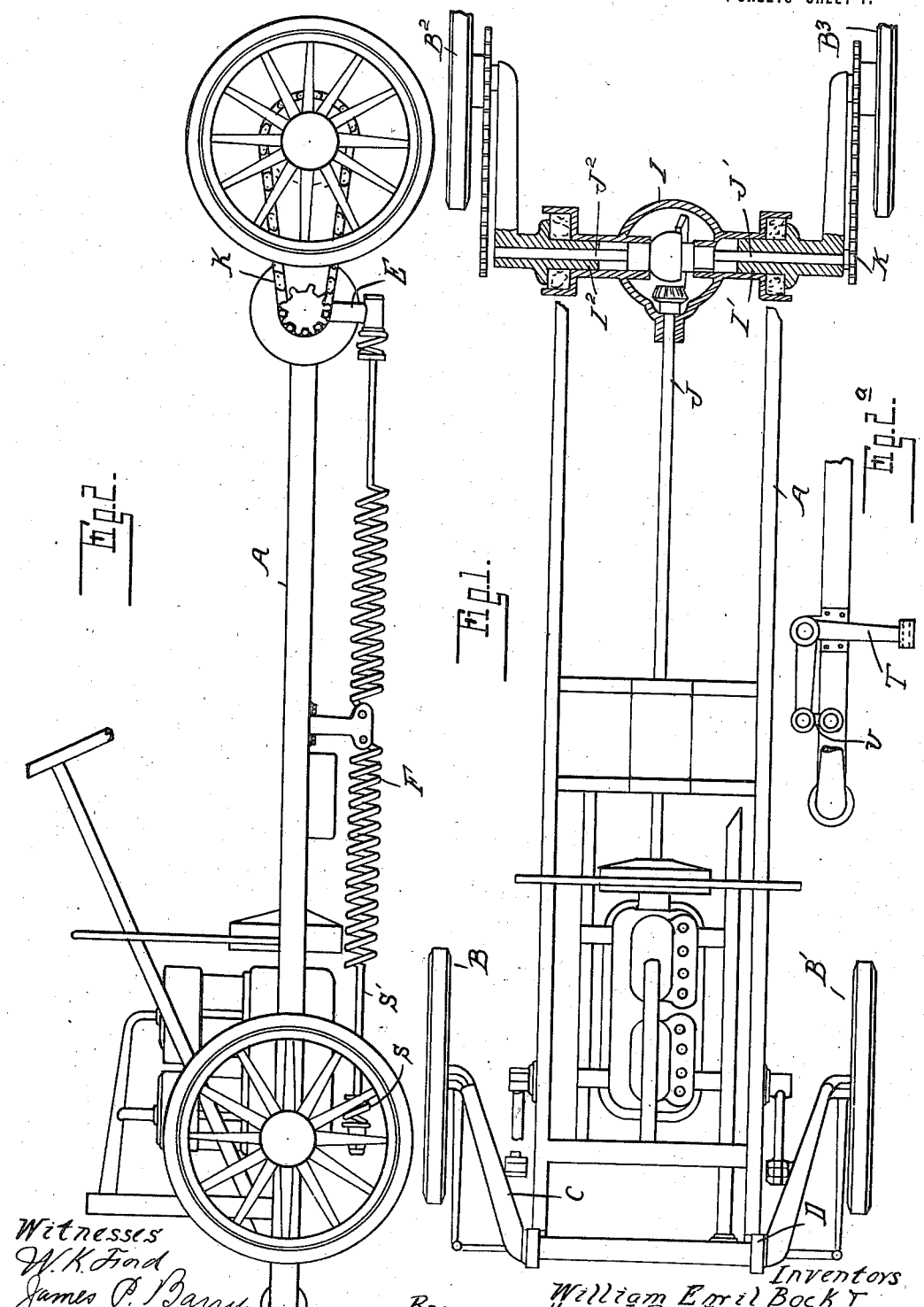

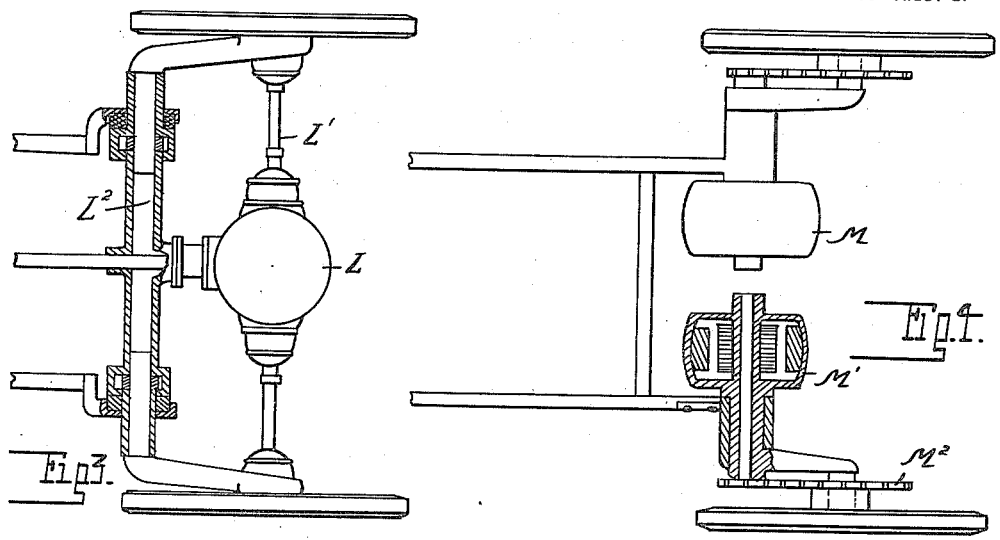
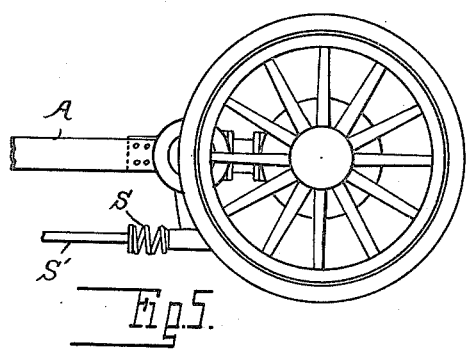
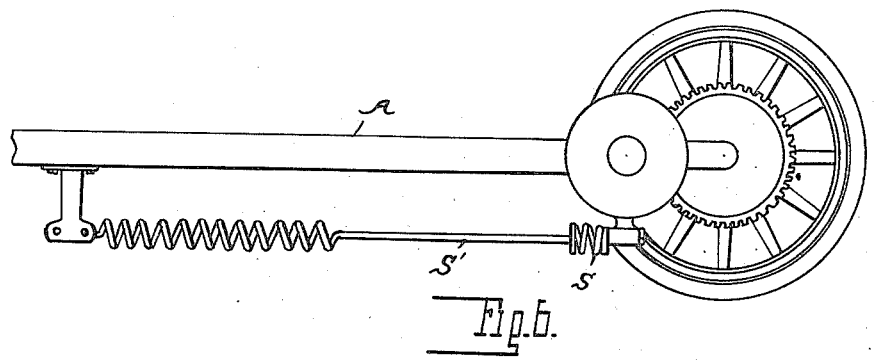

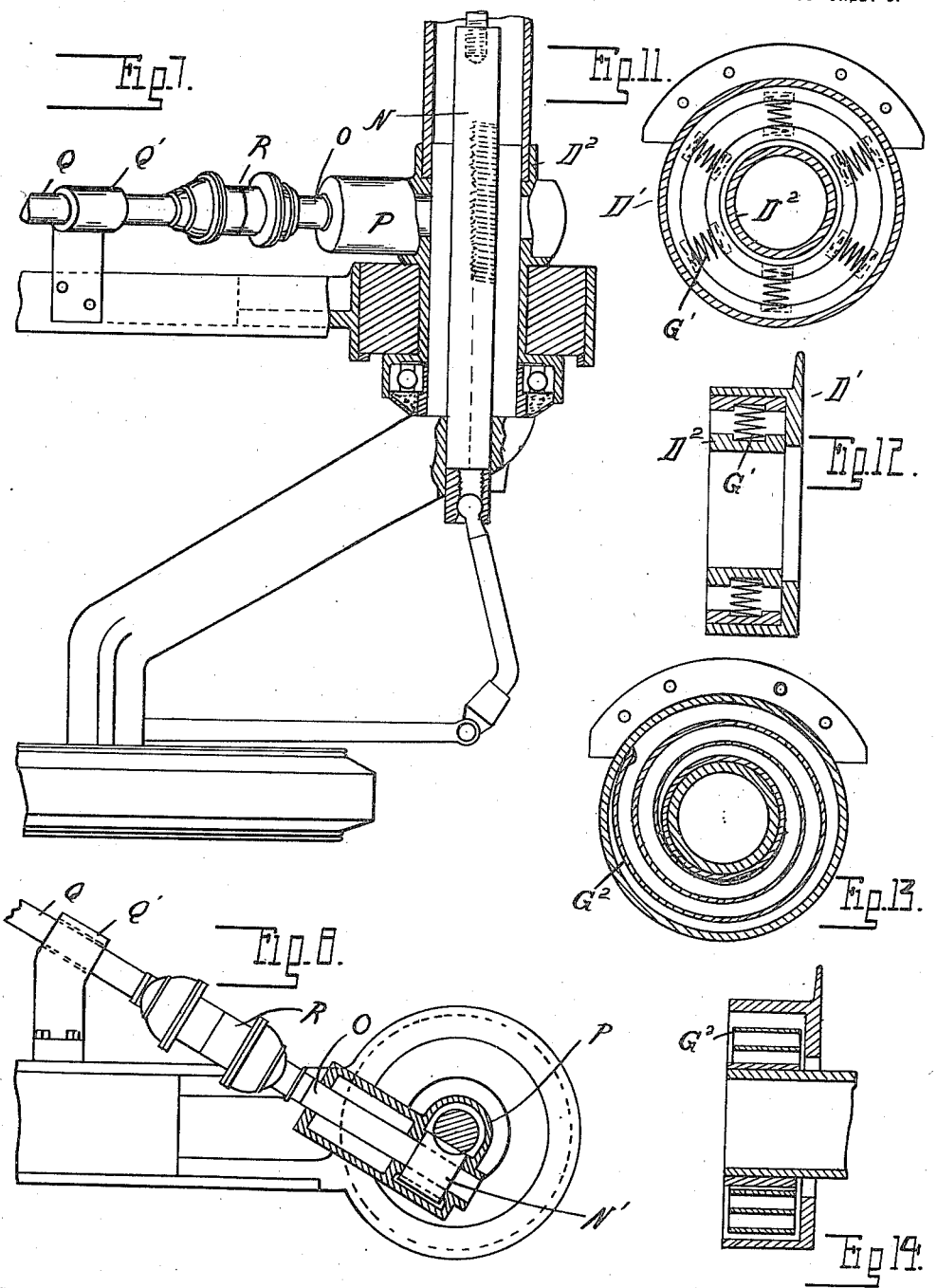

1,226,632.

Patented May 22, 1917.
4 SHEETS—SHEET 4.

Witnesses
W. K. Ford
James P. Barry

Inventors
William Emil Bock
Henry L. Bock
By Whittemore Hulbert & Whittemore
Attys

UNITED STATES PATENT OFFICE.

WILLIAM EMIL BOCK AND HENRY L. BOCK, OF TOLEDO, OHIO; SAID HENRY L. BOCK ASSIGNOR TO SAID WILLIAM EMIL BOCK.

MOTOR-VEHICLE.

1,226,632.　　　　Specification of Letters Patent.　　Patented May 22, 1917.

Application filed July 11, 1913. Serial No. 778,495.

*To all whom it may concern:*

Be it known that we, WILLIAM EMIL BOCK and HENRY L. BOCK, citizens of the United States of America, residing at Toledo, in the county of Lucas and State of Ohio, have invented certain new and useful Improvements in Motor-Vehicles, of which the following is a specification, reference being had therein to the accompanying drawings.

The invention relates to motor vehicles of that type in which the wheels upon opposite sides of the machine are journaled upon independently vertically movable axles, the latter being connected to the vehicle frame by rockable arms and resilient means for holding said arms in normal position. With machines of this type a high degree of flexibility is obtained in compensating for unequal vertical movement of the wheels due to travel over an uneven road bed. Inasmuch, however, as the freedom of movement of the wheels is confined to a vertical plane, there is nothing to prevent the transmission of lateral shocks from the wheels to the frame, which result is undesirable.

It is one of the objects of the present invention to avoid this difficulty by cushioning the frame against lateral as well as vertical shocks, and a further object is to provide for this lateral yielding without interference with the steering mechanism or drive connections between the frame and the wheels.

In the drawings:

Figure 1 is a plan view of the vehicle;

Fig. 2 is a side elevation thereof;

Fig. 2ª is an elevation, with some of the parts broken away;

Fig. 3 is a plan showing a modified construction of drive mechanism;

Fig. 4 is a similar view showing another modification;

Figs. 5 and 6 are side elevations respectively of Figs. 3 and 4;

Fig. 7 is a sectional plan view of the steering gear connections;

Fig. 8 is a side elevation thereof;

Figs. 9, 10, 11, 12, 13, 14, 15, 16, 17, 18 are alternately longitudinal and transverse sections through various modifications of the cushioning means.

A is the vehicle frame; B B' are the steering wheels upon opposite sides of said frame and $B^2$ $B^3$ are the drive wheels therefor; C are the rockable arms for connecting these wheels to the frame and which are journaled in bearings D thereon; and E are depending bell crank arms connected with the supporting arm C, which are connected to resilient members F for yieldably supporting the frame upon said rock arms in normal position.

Figure 9:
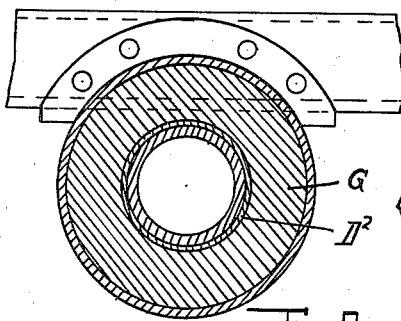
Figure 10:
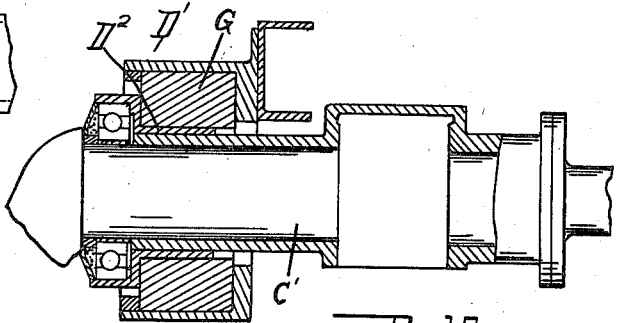
Figure 17:
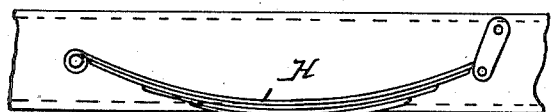
Figure 15:
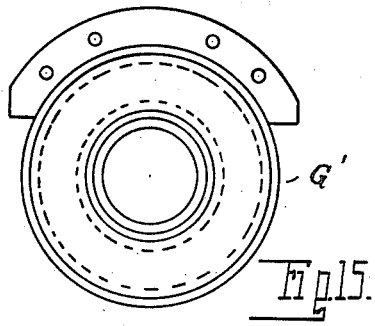
Figure 18:
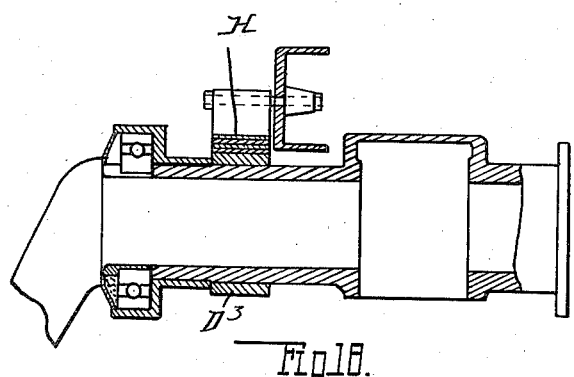
Figure 16:
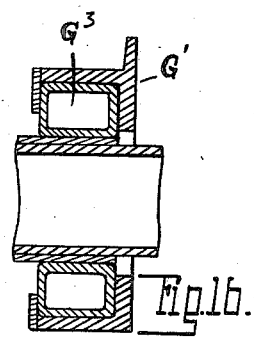

The rock arms C being independently movable will yield under vertical shocks to the wheels, but lateral shocks cannot be cushioned by such a movement. We have therefore provided a cushion support for the rock arm journals upon the frame, which will take care of this lateral stress and shocks. Various specific constructions may be employed for this purpose. As shown in Figs. 9 and 10 the journal for the shank C' of the rock arm C is formed by concentrically arranged outer and inner members D' and $D^2$ between which is interposed a cushion G of suitable material, such as rubber. In Figs. 11 and 12 there is the same arrangement of the members D' and $D^2$, with the interposition of a series of spiral springs G' therebetween, while in Figs. 13 and 14 a spiral spring $G^2$ is interposed between said members. Again in Figs. 15 and 16 a cushion formed by a pneumatic tube $G^3$ is interposed between the members D' and $D^2$, and in Figs. 17 and 18 the journal $D^3$ is yieldably connected to the frame by a semi-elliptic spring H. With all of these various modifications the same effect is produced, viz. the provision for limiting lateral movement of the journal with respect to the frame, together with a resilient means for holding the parts in normal position.

The provision of the cushioning means between the rock arms and the frame necessitates the provision of flexibility in the drive connections and steering connections extending from the frame to the wheels. As shown in Fig. 1, the driving is effected through mechanism mounted within and upon a housing or frame, which, as a unit, is adjustable in relation to the main vehicle frame. Thus, specifically, I is a housing containing the differential gearing which connects the longitudinal transmission shaft J with the transversely extending transmission shafts J' and $J^2$. The latter shafts are journaled in extensions I' and $I^2$ of the housing I, and at their outer ends are connected by sprocket and chain connections K with the drive wheels. The whole casing I I' I² is yieldably connected to the main frame A by any one of the resilient connections shown in Figs. 9 to 18 inclusive.

In Fig. 3, in place of the drive connection above described, the differential gearing is arranged in a housing L in rear of the housing L², forming the journals for the rock arms, and flexible shafts L' form the driving connection between the differential and the wheels. The casing L² is yieldably connected to the main frame A in a similar manner to that previously described.

In Fig. 4 independent motors at M and M' are mounted upon the journals for the rock arms C, to drive the wheels through sprocket and chain connections M², a similar cushioning being provided between each of the journals and the main frame.

The journals for the front wheels of the vehicle may be cushioned by similar means to that already described, but inasmuch as the steering mechanism controls these wheels special provision for flexibility must be provided therein. As shown in Figs. 7 and 8, the steering mechanism comprises a reciprocatory rack bar N extending axially through the journal D, and a pinion N' intermeshing with this rack bar secured to the rotary steering stem O. This steering stem is journaled in a housing P, which is rigidly attached to the inner member D² of the journal so as to be movable therewith independently of the outer member D' and the main frame A. The actuating stem Q for the steering mechanism is journaled in a bearing Q', rigid with the main frame, and between the stems Q and O is a flexible connection R permitting relative lateral movement, and thus the rotary motion of the stem Q is transmitted to the stem O and pinion N', without interfering with the cushioning movement of the journal in relation to the main frame.

To impart stability to the vehicle, it is essential to provide means for returning the wheels to normal position after relative vertical displacement through any cause. The springs F, which are connected to the rock arms E are alone insufficient for this purpose, for the reason; first, that they are only equally deflected when the load is uniformly distributed, or the center of gravity is midway between the wheels; and second, the tilting of the vehicle due to an uneven road bed results in the shifting of the center of gravity toward one side or the other, and the springs alone could not restore the balance. The desired stabilizing effect is obtained by associating with the load-sustaining springs F auxiliary springs or resilient resisting devices, which are thrown into action only when there is a deflection of one of the wheels from normal position.

With the specific construction shown, S is a relatively short coil spring in the connection between the bell crank arm E and a rod or shank S' leading to the spring F. The normal tension of the spring S against axial elongation is greater than the tension of the spring F so that the yielding due to slight inequalities in the road bed will be effected by elongation of the spring F and not the spring S. On the other hand, when there is sufficient movement of the rock arm C to produce an appreciable angular movement of the bell-crank arm E, this will necessitate a pivotal or flexing movement of the connection between the rod S' and said bell-crank arm. The only provision for such a pivoting or flexing is by a bending of the spring S, and the tension of this spring is such as to resist such a bending with a predetermined force the further the bell-crank arm is rocked from its neutral position, with a result that the resistant force increases rapidly and tends to restore the parts to neutral position as soon as the obstruction is passed.

The rock arms which connect the forward wheels of the main frame preferably extend rearwardly from the journal point. To connect these rock arms to the springs F, which hold them in normal position, a bell-crank lever T is preferably fulcrumed upon the frame, one arm of said bell-crank being connected by the pivotal link U with the rockable arm C, while the downwardly-extending arm of the bell-crank is connected by a spring S and shank S' to the spring F. This permits of arranging all of the springs F beneath the frame of the vehicle, where they are conveniently disposed without interference with other parts of the machine.

In addition to the function of cushioning the frame from lateral shocks, our improved construction also cushions shocks longitudinally of the vehicle. It will be understood that when the vehicle is running at high rate of speed, an obstruction in the road bed will not merely produce a vertical shock, but the direction of the resultant forces will be in an inclined line some place between the vertical and horizontal. Thus the yielding of the cushion will be in the direction of these resultant forces and will lessen the shock upon the vehicle frame.

What we claim as our invention is:

1. In a vehicle, the combination with a frame of a supporting wheel therefor, a rockable crank arm independently pivotally connected to said frame and attached at its free end to said wheel, and a lateral cushion interposed between the pivot of said rockable arm and frame.

2. In a vehicle, the combination with a frame, of a supporting wheel therefor, a rockable arm forming a connection between said wheel and frame, a journal bearing for said rockable arm having a lateral cushion connection with the frame, and a steering mechanism mounted on said frame having a flexible operating connection with said wheel.

3. In a vehicle, the combination with a frame of a supporting wheel therefor, a rockable arm forming a connection between said frame and wheel, a journal bearing for said rockable arm having a cushion connection with said frame, steering mechanism for said wheel axially alined with said journal, and an operating mechanism mounted upon said frame flexibly connected with said steering mechanism.

4. In a vehicle, the combination with a frame of a supporting wheel therefor, a rockable arm forming a connection between said wheel and frame, a journal bearing for said arm, a bearing surrounding and spaced from said journal bearing, and a resilient member between said bearing forming a cushion for said journal.

5. In a vehicle, the combination with a frame, of a supporting wheel therefor, a rockable arm forming a connection between said wheel and frame, a journal bearing for said rockable arm having a cushion connection with said frame, and a drive connection for said wheel passing axially through said cushion bearing.

6. In a vehicle, the combination with a frame of a supporting wheel therefor, a rockable arm forming a connection between said frame and wheel, a bell-crank arm for actuating said rockable arm, a resilient longitudinally extensible member connected with said bell-crank arm for sustaining the normal load on said rockable arm, and a laterally flexible resilient member for imposing additional yieldable resistance upon the deflection of said rockable arm.

7. In a vehicle, the combination with a frame of a supporting wheel therefor, a rockable arm forming a connection between said frame and wheel, a longitudinally extensible resilient member for sustaining the normal load on said rockable arm, and an auxiliary resilient member operating upon the deflection of said rockable arm to impose additional resistance to the movement thereof.

8. In a vehicle, the combination with a frame of a supporting wheel therefor, a rockable arm forming a connection between said wheel and frame, a longitudinally extensible resilient member for sustaining the normal load upon said rockable arm, and an auxiliary resilient member operating upon the deflection of said rockable arm to interpose progressively increasing resistance to the movement thereof from normal position.

9. In a vehicle, the combination with a frame of a supporting wheel therefor, a rockable arm for forming a connection between said wheel and frame, a longitudinally extensible resilient member for sustaining the normal load upon said rockable arm, and a laterally flexible resilient member adapted to be flexed by the deflection of said rockable arm and interposing progressively increasing resistance to the movement of said arm.

10. In a vehicle, the combination with a frame of a supporting wheel therefor, a rockable arm forming a connection between said wheel and frame, a bell-crank arm connected to said rockable arm, a longitudinally extensible resilient member connected to said bell-crank arm and yieldably resisting movement of said rockable arm, and a laterally flexible resilient member movable with said bell-crank arm and progressively flexed by the deflection of said rockable arm from normal position.

11. In a vehicle, the combination with a frame, of a supporting wheel therefor, a rockable arm forming a connection between said wheel and frame, a journal bearing for said rockable arm having a cushioned connection with said frame, a housing connected to said journal bearing, a flexible steering stem journaled in said housing, and connections between said steering stem and supporting wheel.

12. In a vehicle, the combination with a frame, of supporting wheels therefor, independently rockable arms forming connections between said wheels and frame, and lateral cushioning connections between each of said rockable arms and said frame.

In testimony whereof we affix our signatures in presence of two witnesses.

WILLIAM EMIL BOCK.
HENRY L. BOCK.

Witnesses:
 R. F. SCHNEIDER,
 A. C. BALL.